United States Patent Office 3,567,717
Patented Mar. 2, 1971

3,567,717
NEW CATIONIC DYESTUFFS AND PROCESSES FOR THEIR PREPARATION
Robert F. M. Sureau, Enghien-les-Bains, Gilbert V. H. Kremer, Ermont, and Marie-Josephe J. Alicot, Soisy-sous-Montmorency, France, assignors to Ugine Kuhlmann, Paris, France
No Drawing. Filed Aug. 9, 1968, Ser. No. 751,348
Claims priority, application France, Aug. 11, 1967, 117,725
Int. Cl. C09b 23/04
U.S. Cl. 260—240  4 Claims

ABSTRACT OF THE DISCLOSURE

Dyestuffs are provided containing an atom grouping of the following formulae:

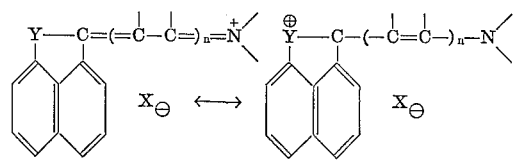

in which X represents a monovalent anion, Y represents an oxygen or sulphur atom and $n$ represents 1 or 2. Processes for the preparation of these dyestuffs are also provided.

---

The present invention concerns new cationic dyestuffs and processes for their preparation. In particular it relates to dyestuffs containing the atom grouping of the following formula:

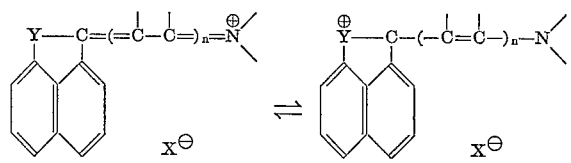

in which X represents a monovalent anion, Y represents an oxygen or sulphur atom and $n$ represents 1 or 2, and to their preparation.

Examples of dyestuffs of this type are those of the general formulae:

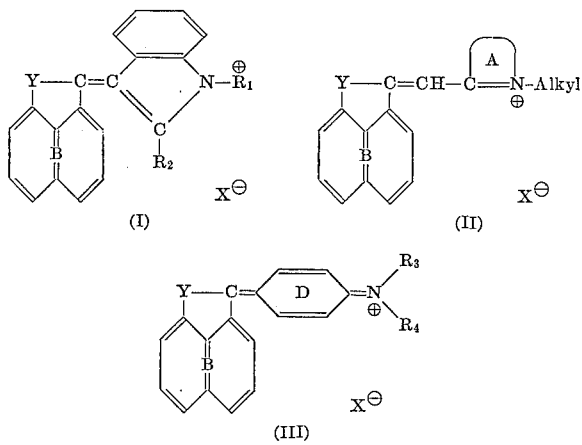

in which X and Y have the same significance as above, the naphthalene nucleus B may be substituted by at least one halogen atom or alkyl, alkoxy or nitro group, $R_1$ represents a hydrogen atom or an alkyl group, $R_2$ represents an alkyl or aryl group, A represents a ring of 5 or 6 atoms, possibly linked to a benzene ring which may be substituted by at least one halogen atom or alkyl or alkoxy group, $R_3$ represents a hydrogen atom or an alkyl or aryl group, $R_4$ represents a hydrogen atom or an alkyl group and the benzene ring D may be substituted by at least one halogen atom or alkyl or alkoxy group. The alkyl and alkoxy groups in these formulae preferably contain from 1 to 4 carbon atoms.

The dyestuffs of general Formula I may be prepared for example by condensing a 1,8-naphtholactone of Formula IV with an indole of Formula V.

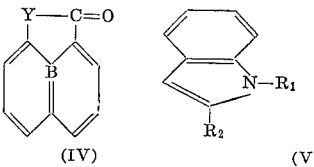

in the presence of a dehydrating agent such as for example phosphorous oxychloride, preferably in the presence of an organic solvent such as for example toluene, the xylenes or chlorobenzene. The reaction is often facilitated by the addition of anhydrous zinc chloride. In the Formulae IV and V, Y, $R_1$, $R_2$ and the possible substituents of the ring B are as defined in Formula I.

The dyestuffs of the general Formula II may be obtained for example by condensing a 1,8-naphtholactonthione of Formula VI with a methylene base of the Formula VII according to the reaction:

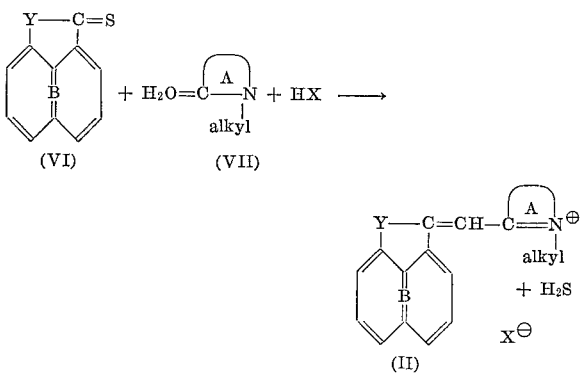

the significance of A, X, Y and the possible substituents of the nucleus B being the same as in the Formula II. This condensation is preferably effected in a weak organic acid such as acetic or propionic acids at a temperature near to boiling. The reaction may be accelerated and its yield increased by adding an alkylating agent in a quantity equal to or greater than the stoichiometric amount. In this case it is found that alkyl-mercaptan is formed instead of hydrogen sulphide, probably owing to the intermediate formation of a very reactive methylthiooxonium compound. All the conventional alkylating agents, such as for example methyl or ethyl sulphate, alkyl halides, alkyl arylsulphonates, methyl or ethyl chloroacetate or bromo-acetate, can be used.

Examples of methylene bases of Formula VII which can be used for the preparation of the dyestuffs of Formula II are 1,3,3-trialkyl-2-methylene-indolines, 1-alkyl-2-methylene-benzothiazolines or benzoxazolines, 1-alkyl-2-methylene-dihydroquinolines and their substituted derivatives.

The 1,8-naphtholactone-thiones of Formula VI are themselves new products which may be prepared for example by the action of phosphorus pentasulphide on the corresponding 1,8-naphtholactones, preferably in the presence of an organic solvent such as toluene or the xylenes at a temperature approaching the boiling point of these solvents. These thiones are well crystallised products of orange-yellow to red-brown colour which are insoluble in water, and are easily recrystallised from organic solvents such as alcohols, benzene hydrocarbons or acetic acid.

The dyestuffs of Formula II may be isolated for example by diluting the reaction mixture, filtering in the presence of carbon black and crystallising by the addition of sodium chloride and possibly zinc chloride to the filtrate.

The dyestuffs of Formula II are crystalline compounds which are soluble in water even in the cold, and in alcohols.

The dyestuffs of general Formula III may be prepared for example by condensing a 1,8-naphtholactone of Formula IV with a benzene amine of Formula VIII in the presence of phosphorus oxychloride according to the reaction:

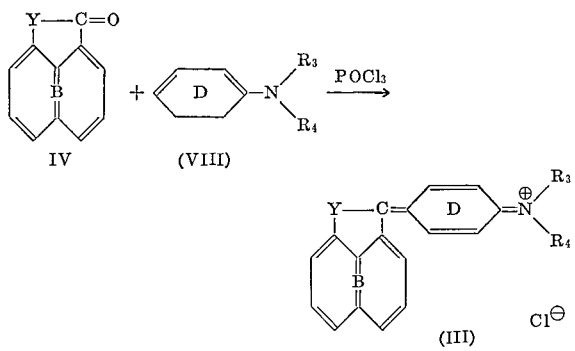

the significance of $R_3$, $R_4$ and Y and the possible substituents of the nuclei B and D being the same as in the Formula III. This condensation may be carried out in the presence of an organic solvent such as for example toluene and in the presence of anhydrous zinc chloride as a catalyst.

The dyestuffs according to the invention have the general properties of cationic dyestuffs. It has been found, in particular that they have a very strong affinity for fibres based on polymers and copolymers of acrylonitrile, to which they give bright, generally very fast shades. The dyestuffs of Formulae I and II provide shades ranging from yellow to bluish red, while those of Formula III give violet and blue shades.

In the following examples which are purely illustrative the parts are parts by weight unless the contrary is stated.

EXAMPLE 1

A solution of 23 parts of 1,8-naphtholactone-thione (2H-naphthol[1,8-bc]furane-2-thione) and 25 parts of freshly distilled 1,3,3-trimethyl-2-methylene-5-methoxy-indoline in a mixture of 150 parts of glacial acetic acid and 18 parts of ethyl chloroacetate is heated under reflux for 4 hours. The volume is made up to 1000 parts with cold water, one part of decolorising charcoal is added and the mixture is filtered. The filtrate is heated to about 80° C., about 200 parts of a saturated sodium chloride solution are added, and the mixture is left to cool. A bronzed crystalline precipitate is thus obtained, which after standing for two hours is filtered off, rinsed with a little 2.5% brine, drained and dried at 60° C. 15 parts of a dyestuff are thus obtained which is very soluble in cold water and dyes polyacrylic fibres a bright red shade of very good fastness, especially to light.

For analysis, the dyestuff was recrystallised from absolute alcohol. It corresponds to the formula:

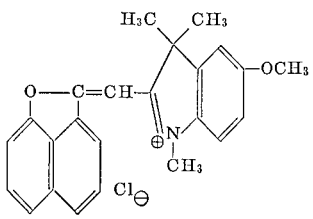

Calculated for $C_{24}H_{22}NO_2Cl,H_2O$ (percent): C, 70.35; H, 5.87; N, 3.42; Cl, 8.67. Found (percent): C, 70.9, 70.5; H, 6.14, 6.07; N, 3.64; Cl, 8.72.

The 1,8-naphtholactone-thione used in this example was prepared as follows: 10 parts of 1,8-naphtholactone are heated under reflux for two hours in 50 parts of dry toluene and 15 parts of phosphorus pentasulphide. The mixture is filtered at the boil, the insoluble material is rinsed with hot toluene, and the toluene is driven from the filtrate and the dry extract is recrystallised from acetic acid. 7 parts of an orange-yellow crystalline product which melts at 140° C. are thus obtained. For analysis it is recrystallised twice from alcohol. M.P. 141–142° C.

Calculated for $C_{11}H_6OS$ (percent): C, 70.95; H, 3.22; S, 17.20. Found (percent): C, 70.9, 71.3; H, 3.61, 3.23; S, 16.7, 16.8.

EXAMPLE 2

On replacing the 5-methoxy-1,3,3-trimethyl-2-methylene-indoline in Example 1 by 22 parts of 1,3,3-trimethyl-2-methylene-indoline, under similar experimental conditions 24 parts of a dyestuff are obtained which dyes acrylic fibres a bright and fast orange shade.

EXAMPLE 3

On replacing the indole derivative in Example 1 by 19.3 parts of 3-methyl-2-methylene-benzothiazoline, under similar conditions a well crystallised dyestuff is obtained which dyes acrylic fibres a fast golden yellow shade.

For analysis, it is recrystallised from absolute alcohol. It corresponds to the formula:

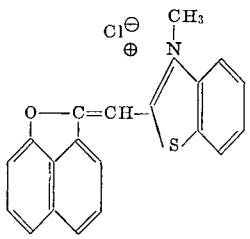

Calculated for $C_{20}H_{14}NOSCl,2H_2O$ (percent): C, 61.93; H, 4.65; N, 3.61; S, 8.26; Cl, 9.17. Found (percent): C, 61.6, 61.4; H, 5.30, 5.16; N, 3.99, 3.83; S, 9.01, 9.05; Cl, 9.79.

EXAMPLE 4

A mixture of 22.5 parts of 1,8-naphtholactone, 24 parts of N-methyl-diphenylamine, 135 parts of anhydrous toluene and 20 parts by volume of phosphorus oxychloride are heated under reflux for about an hour. The mass rapidly turns a deep blue. It is steam distilled, the gummy precipitate is separated by decantation and is taken up in 250 parts of alcohol, then diluted with 250 parts of 5% brine. The dyestuff separates in a waxy form. It is separated by decantation and allowed to harden. This compound, with the probable formula:

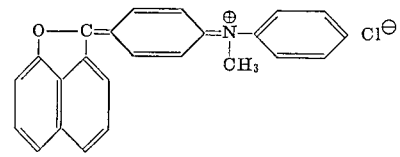

dyes polyacrylic fibres a fast violet blue shade.

EXAMPLE 5

A solution of 10 parts of 1,8-naphthothiolactone-thione (2H-naphtho[1,8-bc] thiophene-2-thione) and 9.5 parts of 1,3,3-trimethyl-2-methylene-indoline in a mixture of 100 parts of glacial acetic acid and 7.5 parts by volume of ethyl chloroacetate is heated under reflux for 8 hours. The mixture is diluted with 500 parts of water, 0.5 part of decolorising charcoal are added and it is filtered. On addition to the filtrate of 50 parts of sodium chloride and a concentrated solution of zinc chloride, a crystalline precipitate of a dyestuff is obtained which dyes polyacrylic fibres a ruby shade.

The 1,8-naphthothiolactone-thione used was obtained as follows: a mixture comprising 4 parts of 1,8-naphthothiolactone, 6 parts of phosphorus pentasulphide and 80 parts of xylene is heated under reflux for 15 minutes, then filtered while hot, and the insoluble material is washed with boiling xylene and the xylene is evaporated. The residue is recrystallised from acetic acid. 1.6 parts of 1,8-naphtho-thiolactone-thione are obtained in the form of red-brown needles melting at 102° C.

EXAMPLE 6

On replacing the indole derivative in Example 5 by 9 parts of 3-methyl-2-methylene - benzothiazoline, after 3 hours boiling and an identical treatment, 8 parts of a dyestuff dyeing acrylic fibres a bright red shade are obtained.

EXAMPLE 7

6.6 parts of 2-methyl-indole and 8.4 parts of 1,8-naphtholactone are dissolved in 60 parts of dry chlorobenzene. 5 parts by volume of phosphorus oxychloride are introduced into this solution at 90–110° C., and the mixture is heated at 110° C., for 4 hours. The chlorobenzene is removed by steam distillation, and the residue is cooled and the precipitate of formula

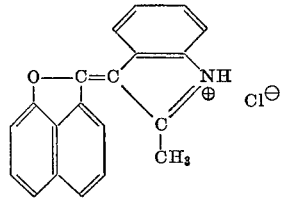

is separated by decantation and redissolved in 200 parts of ethyl alcohol. 10 parts by volume of 10 N caustic soda are added to the solution and the yellow solution obtained is diluted with 400 parts of water. A yellow crystalline precipitate is obtained which is filtered off, washed and dried under vacuum, 9 parts being obtained. It corresponds to the probable formula:

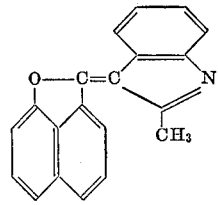

This compound, very soluble in acetic acid, dyes acrylic fibres red. 1.8 parts are dissolved in 60 parts by volume of chloroform and the solution is heated to reflux. Then a mixture of 2 parts of methyl sulphate and 10 parts by volume of chloroform is gradually introduced and refluxing is continued for 2 hours. The solvent is removed by steam distillation, the insoluble part consisting of unreacted starting material is filtered off and 100 parts of sodium chloride and 2 parts of a 50% solution of zinc chloride are added to the filtrate. The crystalline dyestuff is filtered off, drained and dried. It corresponds to the following probable formula:

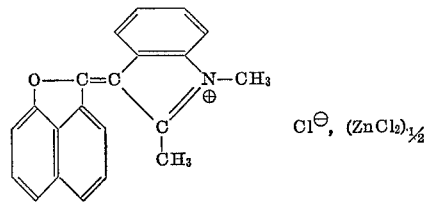

It dyes acrylic fibres a ruby shade.

We claim:
1. A dyestuff of the formula:

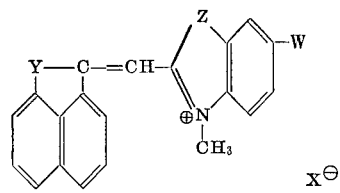

in which Y is oxygen or sulphur, Z is $C(CH_3)_2$ or sulphur, W is H or methoxy, and $X^\ominus$ represents a monovalent anion.

2. The dyestuff of the formula:

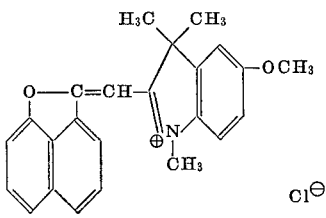

3. The dyestuff of the formula:

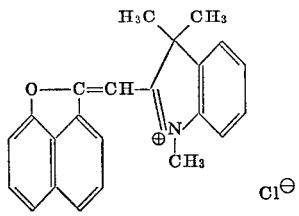

4. The dystuff of the formula:

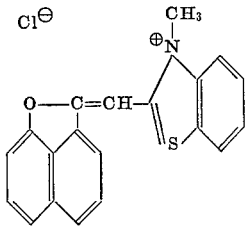

References Cited

Ficken et al., J. Chem. Soc. 1960, pp. 1537 to 1541.

Hawthorne et al., Aust. J. Chem. 1966, vol. 19, pp. 1909 to 1910.

Richter, Organic Chemistry, vol. III, pp. 12 and 38–39 (1923).

Chemical Abstracts, vol. 69, p. 6772 (1968) (abstract of Mostoslavaskii et al.).

JOHN D. RANDOLPH, Primary Examiner

U.S. Cl. X.R.

8—177; 260—330.5, 346.2